United States Patent [19]

Kamiguchi et al.

[11] Patent Number: 5,034,169

[45] Date of Patent: Jul. 23, 1991

[54] INJECTION CONTROL METHOD IN AN ELECTRICALLY-OPERATED INJECTION MOLDING MACHINE

[75] Inventors: Masao Kamiguchi, Oshino; Takayuki Taira, Hachioji; Noriaki Neko; Yuichi Hosoya, both of Oshino, all of Japan

[73] Assignee: Fanuc Ltd., Minamitsuru, Japan

[21] Appl. No.: 455,330

[22] PCT Filed: Jun. 30, 1989

[86] PCT No.: PCT/JP89/00662

§ 371 Date: Jan. 10, 1990

§ 102(e) Date: Jan. 10, 1990

[87] PCT Pub. No.: WO90/00468

PCT Pub. Date: Jan. 25, 1990

[30] Foreign Application Priority Data

Jul. 8, 1988 [JP] Japan ........................ 63-169085

[51] Int. Cl.[5] ........................ B29C 45/76

[52] U.S. Cl. ........................ 264/40.1; 264/40.5; 425/135; 425/162; 425/166

[58] Field of Search ........................ 264/40.1, 40.5, 328.1; 425/135, 145, 149, 159, 162, 166, 169, 171

[56] References Cited

U.S. PATENT DOCUMENTS 4,812,268 3/1989 Kamiguchi et al. ............... 264/40.1
4,826,640 5/1989 Neko ............................. 425/171
4,849,678 7/1989 Kamiguchi et al. ............... 425/150

FOREIGN PATENT DOCUMENTS 61-230917 10/1986 Japan .
63-69618 3/1988 Japan .

*Primary Examiner*—Jill L. Heitbrink
*Attorney, Agent, or Firm*—Staas & Halsey

[57] ABSTRACT

An injection control method for an electrically-operated injection molding machine is provided, which is capable of sharply increasing the injection speed of a low-priced electric injection molding machine. A command pulse train is supplied to a servo circuit for an injection servomotor whereby substantial rotary motion of the injection servomotor is initially prevented, as a result of the fact that the torque limit value (Ts) is set at a value sufficient to establish equilibrium between the output torque of the injection servomotor and the resin pressure acting on the injection screw. The error between the target rotational position of the injection servomotor and an actual rotational position thereof then is allowed to increase until it reaches a feed stop positional error (Fs). The torque restriction is discontinued when the feed stop positional error Fs is reached, and a large drive current is caused to flow in the injection servomotor circuit in correspondence with the actual positional error which has now increased to the feed stop positional error Fs. Thus, the injection screw is initially driven by a great torque generated by the injection servomotor, so that the injection speed rises sharply.

3 Claims, 4 Drawing Sheets

INJECTION CONTROL METHOD IN AN ELECTRICALLY-OPERATED INJECTION MOLDING MACHINE

TECHNICAL FIELD

The present invention relates to an injection control method for an electrically-operated injection molding machine.

BACKGROUND ART

Depending on types of molded products, it sometimes is desirable to more sharply increase the injection speed at the beginning of an injection process. To this end, in conventional hydraulic injection molding machines an accumulator is connected to a hydraulic injection cylinder for supplying pressurized operating oil at a large flow rate to the cylinder. On the other hand, electrically-operated injection molding machines employ injection servomotors capable of producing a large output with small inertia. However, injection molding machines equipped with accumulators or injection motors capable of large output with small inertia are costly.

DISCLOSURE OF THE INVENTION

The object of the present invention is to provide an injection control method for an electrically-operated injection molding machine, whereby the injection speed may be sharply raised even while using a low-priced electric injection molding machine.

To achieve the above-mentioned object, according to the present invention, there is provided an injection control method which is applied to an electrically-operated injection molding machine wherein an injection servomotor driven in accordance with an error between a target value and an actual value of an injection control parameter. The injection control method comprises the steps of: (a) preventing substantial rotational movement of the injection servomotor at an initial stage of injection control, while the target value of the injection control parameter increases; and (b) starting the rotational movement of the injection servomotor when the error between the target value and the actual value of the injection control parameter reaches a predetermined value.

According to the method of the present invention, the injection servomotor is capable of generating a great output torque upon initiation of the rotational movement of the servomotor, even if the servomotor is other than a large output, small inertia type, because the target value of the injection control parameter associated with the rotational movement of the injection servomotor is increased, while substantial rotational movement of the injection servomotor is prevented, and the rotation of the injection servomotor is not started until the error between the target value and the actual value of the injection control parameter reaches a predetermined value. Accordingly, injection speed can rise rapidly even in a less costly injection molding machine, so that injection molding is carried out with a desired injection characteristics.

BEST MODE OF CARRYING OUT THE INVENTION

Figure 1:
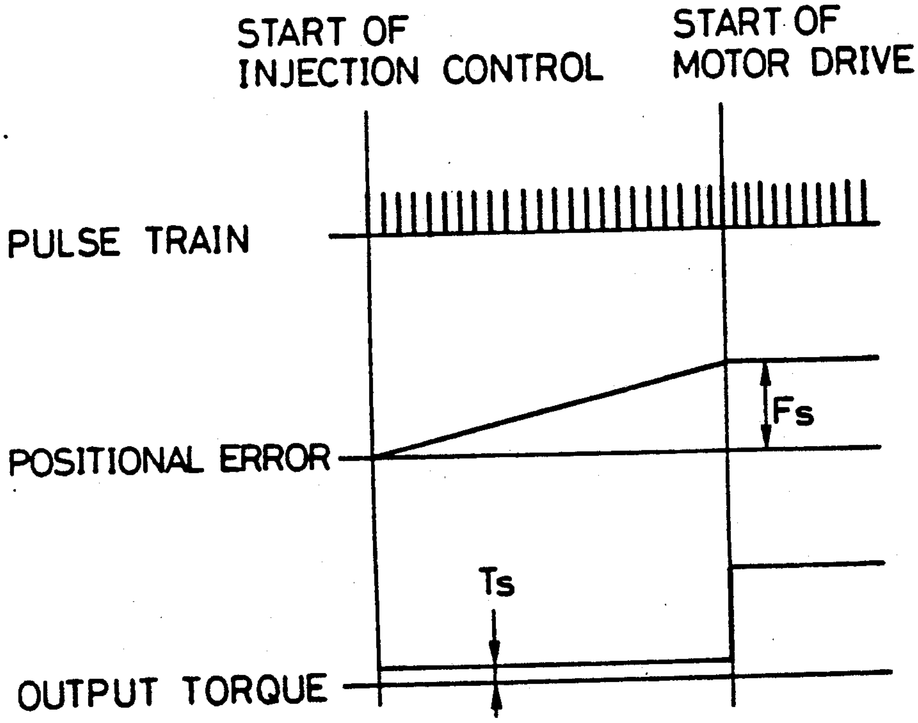
FIG. 1 is a view showing the operational principles of an injection control method according to an embodiment of the present invention.

The operational principles of an injection control method according to an embodiment of the present invention will be explained with reference to FIG. 1.

Conventionally in injection control methods wherein command pulses are periodically distributed to a servo circuit to provide a target rotational position, for an injection servomotor connected to the servo circuit for driving the same motor which position varies depending on the pulse distribution level, the pulse distribution amount per pulse distribution period is increased at an accelerating rate from the start of an injection process with lapse of time, and at the same time, actual rotational position of the servomotor is immediately caused to follow the target rotational position from the instant at which the injection process is started, so that the axial movement of the injection screw is initiated simultaneously with the beginning of the command pulse train. In order to rapidly increase the injection speed in such control circumstances the rotation rate of the injection servomotor must be increased rapidly upon initiation of the axial movement of the injection screw. To this end, it is conventional to utilize high output, low inertia injection servomotor.

The injection control method of the present invention contemplates the achievement of a rapid increase injection speed without the need for utilization of a large output, low inertia injection servomotor. In other words, the invention/provides for the generation of a large motor output torque at the beginning of the axial movement of the injection screw even while using an ordinary servomotor. To this end, during the initial stages of the supply of a command pulse train, substantial driving of the injection servomotor, i.e., substantial axial movement of the injection screw is prevented. More specifically, a torque limit value Ts for restricting the output torque of the injection servomotor is set to a value sufficient to establish equilibrium between the motor output torque and the resin pressure acting on the screw, i.e., the pressure of the molten resin in the heating cylinder, which accommodates the injection screw, Thus the operation of the injection servomotor is first started only when the target rotational position of the injection servomotor, which has been increased while substantial increase in the actual rotational position of the motor has been prevented, reaches a predetermined value (feed stop positional error Fs), i.e., only when the error between the target rotational position and the actual rotational position reaches the predetermined value. More specifically, the application of the torque limit value Ts is discontinued only when the feed stop positional error Fs has been reached. As a result, at the time that the motor begins to rotate the injection servomotor is supplied with a large electric drive current determined by the actual positional error which has been increased to the value Fs. Thus, the injection servomotor is able to generate a large output torque for axially driving the injection screw with a great driving force. As a consequence, injection speed rises rapidly.

Meanwhile, feed stop positional error Fs is a control parameter which is associated with the conventional feed stop function of an injection molding machine. The feed stop function is used to temporarily stop the distribution of command pulses and the same is rendered effective to stop such distribution instantaneously when the actual positional error exceeds the value Fs and continues to be so effective until the actual positional error again becomes less than the value Fs.

The electrically-operated injection molding machines to which the injection control method according to an embodiment of the present invention is applied, comprise various operating sections (not shown) such as injection mechanisms screw rotation mechanisms mold-clamping mechanisms and eject mechanisms arranged so as to control the drive of these operating sections by means of a numerical control unit (hereinafter referred to as an NC unit), and a programmable machine controller (not shown). The injection mechanism includes an injection servomotor 2 (FIG. 2), consisting of a D.C. servomotor, for instance, having a pulse coder 3 and which is operable to axially drive a screw 1 disposed within a heating cylinder 4 through a rotary motion/linear motion conversion mechanism (not shown).

Figure 2:
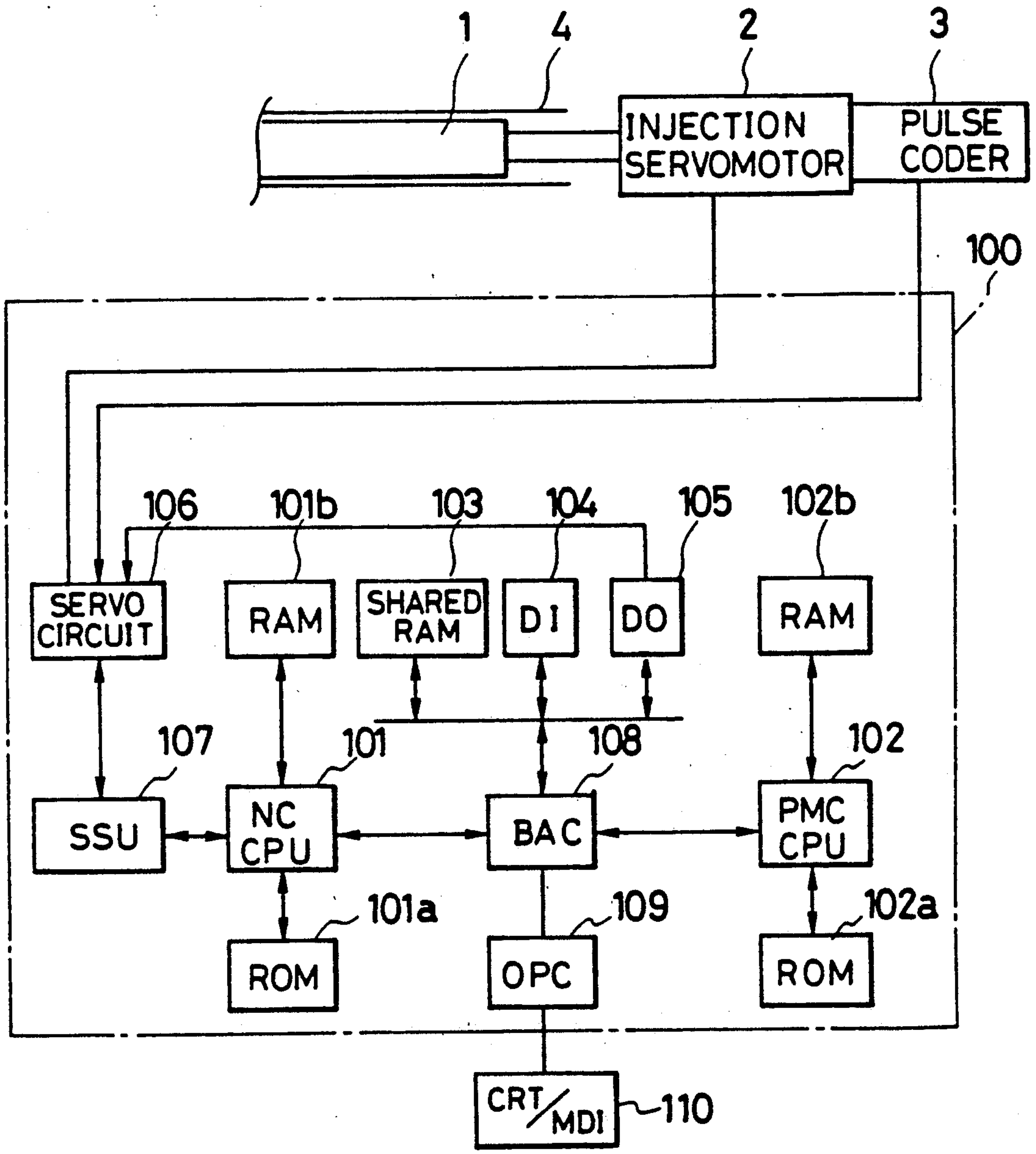
FIG. 2 is a block diagram showing the essential parts of an injection molding machine to which the injection control method of FIG. 1 is applied.

Referring to FIG. 2, the NC unit 100 includes a central processing unit for numerical control (hereinafter, referred to as NCCPU) 101 to which is connected a ROM 101*a* storing therein a management program for globally controlling the injection molding machine, and a RAM 101*b* for temporary storage of data. Further, servo circuits for controlling the drive of servomotors of the various operating sections are connected to NCCPU 101 through a servo interface 107 (only the servo circuit corresponding to the injection servomotor 2 is shown by reference numeral 106). The NC unit 100 further includes a central processing unit for the programmable machine controller (hereinafter referred to as PMCCPU) 102 to which is connected a ROM 102*a* storing therein, e.g., a sequence program for controlling the sequential operation of the injection molding machine, and a RAM 102*b* for temporary storage of data.

Reference numeral 103 denotes a non-volatile shared RAM, consisting of bubble memory, CMOS memory or the like, for storing therein an NC program and various molding condition parameters (injection speed, injection end screw position and the like); and reference numerals 104 and 105 respectively denote an input circuit and an output circuit. Respective busses of the aforesaid elements 101–105 are connected to a bus arbiter controller (hereinafter referred to as BAC) 108 for controlling the selection of busses to be enabled during certain information processing cycles of the NC unit 100. Further, a manual data input device with a CRT display (hereinafter referred to as CRT/MDI) 110 is connected to BAC 108 through an operator panel controller 109, so that an operator is permitted to operate various operative keys of CRT/MDI 110 including software keys and ten-key pad, so as to input various control parameters including the molding condition parameters.

Figure 3:
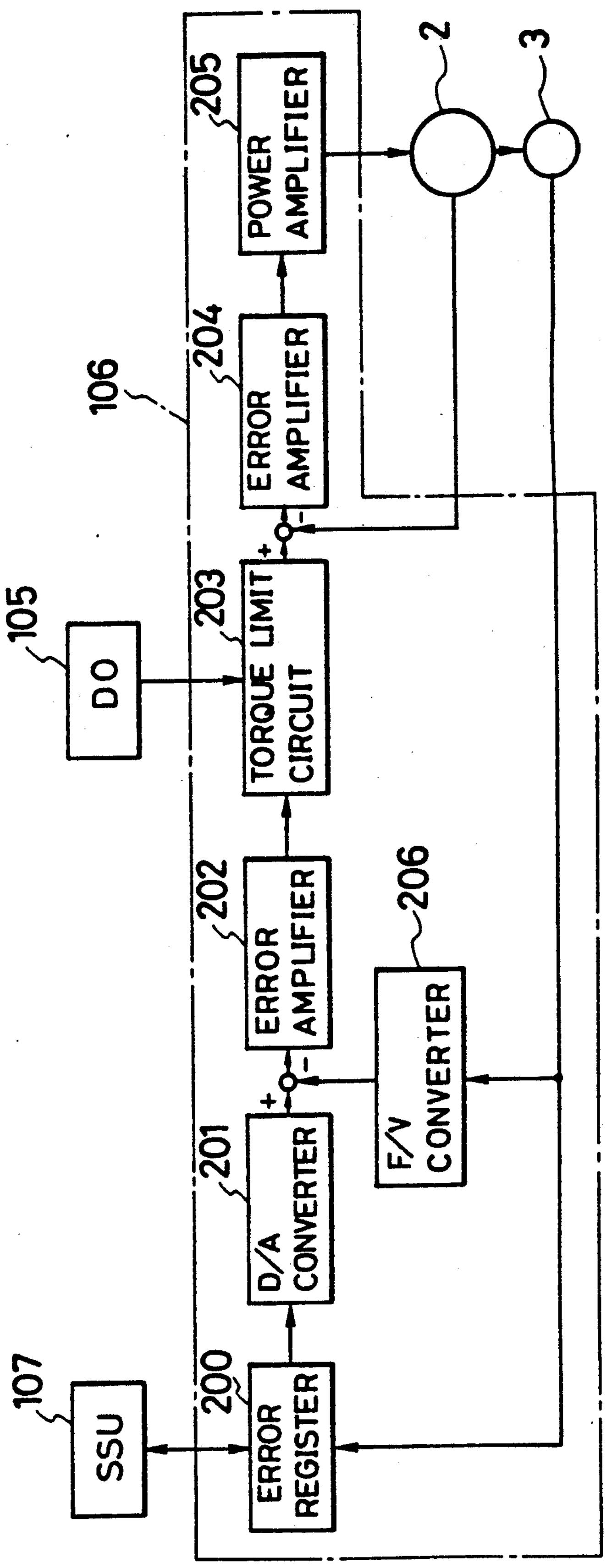
FIG. 3 is a block diagram the servo circuit of FIG. 2.

As shown in FIG. 3, servo circuit 106 for controlling the drive of the injection servomotor 2 comprises an error register 200 arranged to receive a command pulse train, which is then distributed by NCCPU 101 through servo interface 107 and which is indicative of the target servomotor rotational position, and a pulse train supplied from the pulse coder 3 and which is indicative of the actual servomotor rotational position. The output from error register 200 and which is indicative of actual positional error is converted into a velocity voltage command by D/A converter 201, and a frequency at which the pulses delivered from pulse coder 3 are generated is converted into a voltage indicative of the actual rotational speed of the servomotor by means of a F/V converter 206, further the error (velocity error) between the two voltages is amplified by an error amplifier 202 so as to provide a torque command voltage. A torque limit circuit 203, receives on one hand the torque command voltage, and, on the other hand, a torque limit value delivered through circuit 105 from PMCCPU 102, so as to limit the torque command value up to the torque limit value. Further, the error between the torque command voltage after torque restriction and a voltage, which is detected by an appropriate means (not shown) and which is indicative of actual motor drive current and therefore corresponds to actual motor output torque, is amplified by an error amplifier 204 and a power amplifier 205, and then the thus amplified error is applied to injection servomotor 2 for control of the motor output torque.

Further, the injection molding machine comprises a feed stop function for temporarily stopping the pulse distribution when the stored value in error register 200, i.e., the actual positional error, exceeds a predetermined value (hereinafter, referred to as feed stop positional error) set beforehand, until the actual positional once again becomes less than the feed stop positional error.

The operation of the injection molding machine described above is as follows.

Prior to execution of an injection molding cycle by the injection molding machine, an operator operates a keyboard of the CRT/MDI 110 so as to input the feed stop positional error Fs and the torque limit value Ts, which values have been explained hereinabove with reference to FIG. 1. The torque limit value Ts is set to a value which permits achievement of equilibrium between the output torque of injection servomotor 2 and resin pressure at the initial stages of injection control. The feed stop positional error Fs is set to a value which permits the injection operation to begin with an injection speed which rises sharply operation of the servo circuit 106, when the application of the torque limit value Ts to torque limit circuit 203 is discontinued under a condition where the actual positional error accumulated in error register 200 of servo circuit 106 has reached the value of Fs. In other words, the value Fs is set to a value which is different from, e.g., larger than the ordinary feed stop positional error setting for prevention of overshoot and undershoot with respect to the target servomotor rotational position during a conventional acceleration/deceleration operations. Further, setting of various control parameters other than the values of Ts and Fs is carried out. Whereupon, the thus set control parameters are stored in respective predetermined address regions of shared RAM 103, under the control of PMCCPU 102.

During operation of the injection molding machine, NCCPU 101 performs the distribution of pulses to servo circuits of associated operating sections of the machine through servo interface 107, and PMCCPU 102 performs sequence control for associated operating sections, in accordance with the NC program and various control parameters stored in shared RAM 103 and with the sequence program stored in ROM 102*a*. As a result, the injection molding cycle, which consists of a series of processes of mold-opening, mold-closing, mold-clamping, metering, injection, hold, ejection of a molded product, etc., is carried out in basically the same manner as in conventional molding machines.

Figure 4:
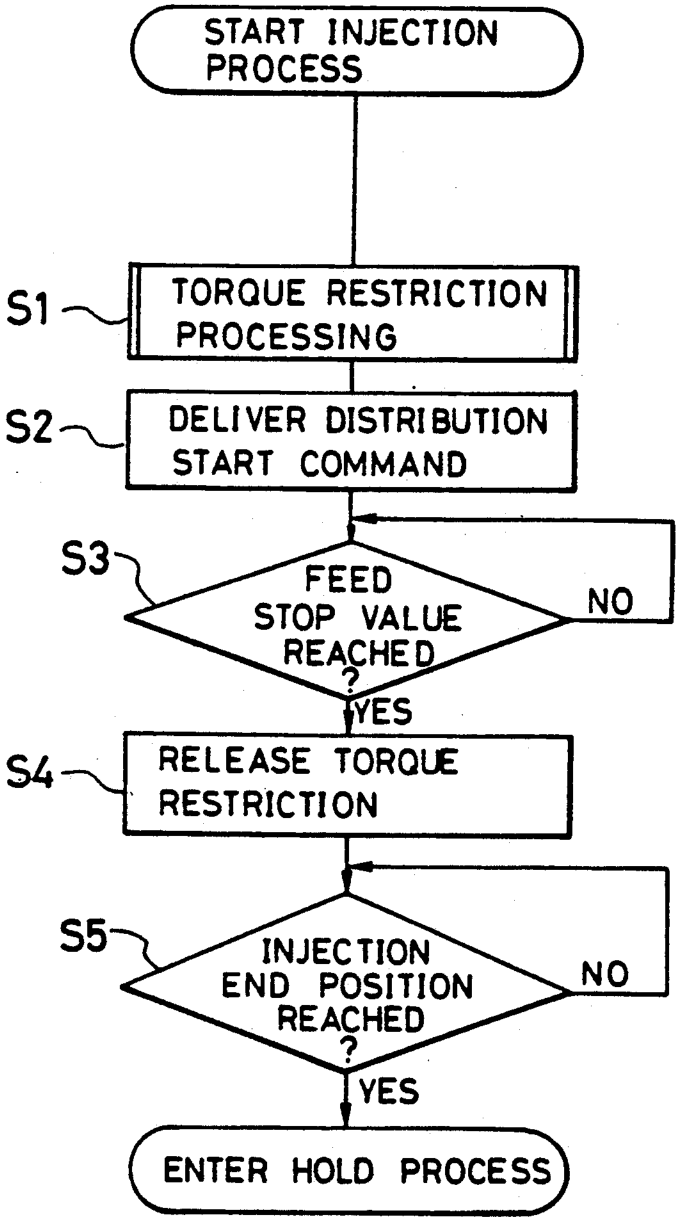
FIG. 4 is a flowchart showing the injection control process as executed by the control unit of FIG. 2.

During the injection process, PMCCPU 102 executes the processing shown in FIG. 4.

At the start of the injection process, PMCCPU 102 reads out the torque limit value Ts from shared RAM 103 and sets the same in the torque limit circuit 203 of servo circuit 106, through BAC 108 and output circuit 105 (step S1), PMCCPU 102 then delivers an injection start command to NCCPU 101 through BAC 108 and shared RAM 103 (step S2). Upon receipt of this command, NCCPU 101 starts pulse distribution a function which is to be executed by the NCCPU 101 at predetermined intervals during the cycle in accordance with the molding conditions stored in shared RAM 103. As a result, as shown in FIG. 1, a command pulse train is supplied from NCCPU 101 to error register 200 of servo circuit 106. On the other hand, the torque limit value Ts has been already set in step S2 as explained above and accordingly, the output torque of injection servo motor 2 is so controlled as to be in balance with the resin pressure. As a result, the substantial rotary movement of injection servomotor 2 and substantial axial movement of screw 1 are prevented. In this manner, the supply of the command pulse train is continued while rotation of the injection servomotor 2 remains stopped, and thus, the accumulation of pulses in error register 200 continues, and therefore the actual positional error increases with the elapse of time.

During this time period, NCCPU 101 writes, at predetermined intervals during the cycle, the actual positional error, and this value is read out by error register 200 through servo interface 107, and into shared RAM 103. On the other hand, PMCCPU 102 determines whether or not the actual positional error written into shared RAM 103 has reached the feed stop positional error value Fs. When the actual positional error reaches the value of Fs, PMCCPU 102 causes the torque limit value to change from the value Fs to a value corresponding to the maximum output torque of injection servomotor 2, for instance, to thereby discontinue the torque restriction which has been applied to injection servomotor 2 (step S4).

When the torque restriction is discontinued torque limit circuit 203 permits the supply of a large torque command voltage to error amplifier 204, and such command voltage is delivered from error amplifier 202 at a large value corresponding to a large actual positional error that is equal to the value Fs stored in error register 200 at that time. As a result, in accordance with a control output from power amplifier 205 corresponding to the large torque command voltage, a large drive current is claused to flow to injection servomotor 2, so that injection servomotor 2 which has been kept in an unrotating state while the torque restriction was in effect, is now acused to rotate with a great amount of torque. As a result, screw is driven axially with a great drive force by means of injection servomotor 2 through the rotary motion/linear motion conversion mechanism. In other words, the injection speed rises sharply.

Thereafter, when the actual positional error reaches the feed stop positional error Fs during the injection operation by screw 1, the pulse distribution for injection servomotor 2 is temporarily discontinued, and the same is restarted only when the actual positional error again becomes less than the value Fs. During the injection operation, PMCCPU 102 determines whether or not the pulse distribution up to the injection end screw position is completed i.e., whether the screw 1 has reached its injection end position (step S5). If so, PMCCPU 102 completes processing of FIG. 4. And the conventional hold process is instuted.

The present invention is not limited to the aforementioned embodiment, but may be modified in various ways. For example, although, in the described embodiment, the torque limit value Ts employed in the initial stage of the injection process is stored beforehand in shared RAM 103, the torque limit value Ts may instead be described in the sequence program. Further, the present invention may be applied to an injection molding machine which is not equipped with a feed stop function although the foregoing embodiment is applied to an injection molding machine which does have a feed stop function. In this case, a predetermined positional error corresponding to the feed stop positional error Fs is stored beforehand in shared RAM 103. Moreover, although in the above described embodiment the feed stop function of the injection molding machine is employed for obtaining a sharply rising injection speed, this feed stop function may be used in an ordinary manner for prevention of overshoot and undershoot during acceleration/deceleration control, while the value of Fs for embodying the method of the invention is independently set in shared RAM 103. In this case, the injection molding machine is provided with an ordinary feed stop function and the function of sharply raising the injection speed is performed according to the method of the present invention.

We claim:

1. An injection control method for operation of an electrically-operated injection molding machine having an injection servomotor which is driven in accordance with an error between a target value and an actual value of an injection control parameter, comprising steps of:

(a) preventing substantial rotational movement of the injection servomotor during an initial stage of injection control, while the target value of the injection control parameter increases; and (b) starting the rotational movement of the injection servomotor when the error between the target value and the actual value of the injection control parameter reaches a predetermined value.

2. An injection control method according to claim 1, wherein said injection molding machine has injection screw that is driven by the injection servomotor, and wherein a command pulse train is periodically distributed to a servo circuit operatively connected to the injection servomotor so as to provide a target value of a rotational position of the servomotor as said injection control parameter;

wherein said step of preventing substantial movement includes, in an initial stage of supply of the command pulse train, a step of setting a torque limit value for restricting the output torque of the injection servomotor to a value sufficient to establish equilibrium between the output torque of the injection servomotor and the pressure of molten resin acting upon said injection screw to thereby restrict the output torque of the injection servomotor; and wherein said step of starting the movement includes a step of discontinuing the restriction of the output torque of the injection servomotor when the error between the target rotational position of the injection servomotor and an actual rotational position thereof increases to a predetermined value.

3. An injection control method according to claim 2, wherein the distribution of said command pulse train is temporarily discontinued when the error between the target rotational position and the actual rotational position of the injection servomotor reaches said predetermined value and until said error again becomes less than said predetermined value.

* * * * *

UNITED STATES PATENT AND TRADEMARK OFFICE
CERTIFICATE OF CORRECTION

PATENT NO. : 5,034,169

DATED : July 23, 1991

INVENTOR(S) : MASAO KAMIGUCHI, TAKAYUKI TAIRA, NORIAKI NEKO and YUICHI HOSOYA

It is certified that error appears in the above-identified patent and that said Letters Patent is hereby corrected as shown below:

FRONT PAGE [54] "IN" should be --FOR--.

Column 1, line 1, "IN" should be --FOR--;
line 16, after "chines" insert a comma --,--;
line 37, after "servomotor" insert --is--;
line 41, "at" should be --during--.

Column 2, line 4, after "diagram" insert --showing--;
line 18, after "motor" insert --, and--;
line 29, after "circumstances" insert a comma --,--;
line 38, "invention/provides" should be --invention provides--;
line 50, after "cylinder" delete the comma ",", after "screw" delete the comma "," and substitute a period --.--.

Column 3, line 14, after "mechanisms" insert a comma --,-- (both occurrences);
line 15, "after "mechanism" insert a comma --,-- (first occurrence), before "arranged" insert --, and the same are--;
line 21, after "3" insert a comma --,--.

Column 4, line 7, ", further" should be --. Further--;
line 10, after "203" delete the comma ",";
line 28, after "positional" insert --error--;
line 43, after "sharply" insert --upon--.

UNITED STATES PATENT AND TRADEMARK OFFICE
CERTIFICATE OF CORRECTION

PATENT NO. : 5,034,169

DATED : July 23, 1991

INVENTOR(S) : MASAO KAMIGUCHI, TAKAYUKI TAIRA, NORIAKI NEKO and YUICHI HOSOYA

It is certified that error appears in the above-identified patent and that said Letters Patent is hereby corrected as shown below:

Column 5, line 10, delete the comma ",";
line 13, after "distribution" insert a comma --,--;
line 21, after "above" insert a comma --,--;
line 30, "elapse" should be --lapse--;
line 38, after "Fs" insert --( step S3)--;
line 45, after "discontinued" insert a comma --,--;
line 57, "acused" should be --caused--;
line 58, after "screw" insert --1--;

Column 6, line 2, after "completed" insert a comma --,--;
line 4, "And" should be --and--;
line 5, instuted" should be --instituted--.

Signed and Sealed this

Twelfth Day of January, 1993

*Attest:*

DOUGLAS B. COMER

*Attesting Officer*

*Acting Commissioner of Patents and Trademarks*